(12) United States Patent
Lefevre et al.

(10) Patent No.: US 11,388,494 B2
(45) Date of Patent: Jul. 12, 2022

(54) OPTICAL LINE TERMINAL AND AN OPTICAL NETWORK UNIT AND METHODS THEREFOR

(71) Applicant: Nokia Solutions and Networks Oy, Espoo (FI)

(72) Inventors: Yannick Lefevre, Heverlee (BE); Paul Henri Marie Cautereels, Hingene (BE); Jochen Maes, Antwerp (BE)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/136,766

(22) Filed: Dec. 29, 2020

(65) Prior Publication Data

US 2021/0219033 A1 Jul. 15, 2021

(30) Foreign Application Priority Data

Jan. 14, 2020 (EP) .................................... 20151843

(51) Int. Cl.
*H04Q 11/00* (2006.01)
*H04L 1/00* (2006.01)

(52) U.S. Cl.
CPC ....... *H04Q 11/0067* (2013.01); *H04L 1/0002* (2013.01); *H04L 1/0042* (2013.01); *H04Q 2213/072* (2013.01)

(58) Field of Classification Search
CPC ............... H04B 10/27; H04Q 11/0067; H04Q 2213/072; H04L 1/0002; H04L 1/0042
See application file for complete search history.

(56) References Cited

U.S. PATENT DOCUMENTS

| | | | | |
|---|---|---|---|---|
| 2010/0142975 | A1* | 6/2010 | Ivry | ..................... H04L 25/4906 398/182 |
| 2013/0156420 | A1 | 6/2013 | Amitai et al. | |
| 2016/0329915 | A1* | 11/2016 | Luo | ..................... H03M 13/356 |
| 2019/0174212 | A1* | 6/2019 | Detwiler | ............... H04L 1/0009 |
| 2019/0190650 | A1* | 6/2019 | Gao | ..................... H04L 1/0075 |

OTHER PUBLICATIONS

European Search Report for European Patent Application No. 20151843 dated Jul. 16, 2020.
Werner Van Hoof Nokia Belgium: "G. hsp: Reducing ONU complexity through FEC codeword interleaving;C1914", ITU-T Draft; Study Period 2017-2020; Study Group 15; Series C1914, International Telecommunication Union, Geneva; CH, vol. 2/15, Jan. 14, 2020 (Jan. 14, 2020), pp. 1-6.

* cited by examiner

*Primary Examiner* — Dzung D Tran
(74) *Attorney, Agent, or Firm* — Harness, Dickey & Pierce, P.L.C.

(57) ABSTRACT

According to example embodiments, the OLT includes at least one processor and at least one memory including computer program code, the at least one memory and computer program code configured to, with the at least one processor, cause the OLT to perform grouping data units for the ONUs in groups, wherein a group includes data units for a subset of the ONUs, encoding the groups of data units into respective sets of at least one codeword, interleaving the at least one codeword of the respective sets thereby obtaining a stream of codewords, and sequentially transmitting the stream of codewords to the ONUs.

14 Claims, 7 Drawing Sheets

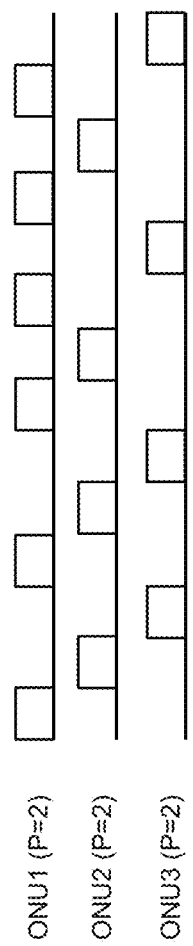

OPTICAL LINE TERMINAL AND AN OPTICAL NETWORK UNIT AND METHODS THEREFOR

CROSS-REFERENCE TO RELATED APPLICATIONS

The present application claims priority under 35 U.S.C. § 119 to European Patent Application No. 20151843.8, filed on Jan. 14, 2020, in the European Patent Office, the entire contents of each of which are hereby incorporated by reference.

TECHNICAL FIELD

Various example embodiments relate to an optical line terminal, OLT, and a method therefor. Further example embodiments relate to an optical network unit, ONU, and a method therefor.

BACKGROUND

In a point-to-multipoint optical network (passive or active) an Optical Line Terminal, OLT is coupled to multiple Optical Network Units, ONU, in respective optical endpoints via an Optical Distribution Network, ODN. The ODN typically has a tree and branch architecture and comprises optical fibres and passive splitters/combiners that split the optical signals in the downstream directions from the OLT to the ONUs, and, multiplexes the optical signals in the upstream direction from the ONUs to the OLT. The downstream communication from the OLT to the ONUs is performed by broadcasting data for different ONUs in separate timeslots (referred to as Time Division Multiplexing; TDM). In the upstream direction, each ONU is assigned a time slot to transmit its data towards the OLT (referred to as Time Division Multiple Access; TDMA), resulting in a burst communication. It is noted that ONU and is commonly referred to as ONT (Optical Network Terminal) and that terms ONU and ONT may be used interchangeably.

In a passive optical network, in downstream transmission, the OLT broadcast a stream of encoded data frames to all ONUs. The ONUs then have to decode the received stream, decapsulate the decoded data frames, select the data frame addressed to them and discard the others. As a result, the decoding rate and the decapsulation rate of the ONUs has to match the line rate of the PON.

SUMMARY

Amongst others, it is an object of embodiments of the present disclosure to provide a solution for a high-speed PON supporting complex coding schemes while limiting the processing requirements of the ONUs.

The scope of protection sought for various embodiments of the invention is set out by the independent claims.

The embodiments and features described in this specification that do not fall within the scope of the independent claims, if any, are to be interpreted as examples useful for understanding various embodiments of the invention.

This object is achieved, according to a first example aspect of the present disclosure, by an optical line terminal, OLT, configured to communicate in a passive optical network, PON, with optical network units, ONUs, the OLT comprising at least one processor and at least one memory including computer program code, the at least one memory and computer program code configured to, with the at least one processor, cause the OLT to perform:
grouping data units for the ONUs in groups, wherein a group comprises data units for a subset of the ONUs;
encoding the groups of data units into respective sets of at least one codeword;
interleaving the at least one codeword of the respective sets thereby obtaining a stream of codewords; and
sequentially transmitting the stream of codewords to the ONUs.

By grouping data units in groups for a subset of ONUs and encoding the groups of data units, sets of codewords are derived. For example, the data units may be grouped in two, three, or four groups. A stream of codewords is then constructed by interleaving the codewords of the different sets in a particular fashion. The interleaving can be done, for example, in a random fashion or by alternating the codewords from the different sets of codewords, for example in a round-robin fashion. Interleaving the codewords of the different sets in an alternating fashion allows maximizing the time between codewords containing data frames designated to the same ONU. Depending on the number of subsets of ONUs and how the codewords of the different subsets are interleaved, an ONU may decode for example every second or fourth codeword. This reduces the decoding complexing at the ONU significantly, as the ONU's decoder is not required to operate at a full line rate because the ONU does not need to decode all codewords. Therefore, implementation complexity at the ONU is greatly simplified as the decoder is not required to operate at a full line rate. The same may apply to frame decapsulation of the ONU. Therefore, even if the OLT is upgraded to operate at higher data rates, there is no need to upgrade every ONU to have decoding and decapsulation capabilities that match the OLT's high data rate as the ONUs would still be allowed to decode and decapsulate at lower data rates. Moreover, this further allows for energy saving. For example, parts of the hardware of the ONU, such as the decoder, may be put to a sleep mode during the time when the codewords containing data frames for the other ONUs subsets would be processed. Alternatively, instead of energy saving, the ONU may be set to executing a higher number of decoding iterations during the time data frames for the other subsets are being received. This way the ONUs may achieve better error performance.

The ONUs may be allocated to subsets such that the channel properties of ONUs in the subset are similar. The different groups of data units may be encoded using different forward error correction (FEC) codes that are adapted to channel properties of the corresponding subset of ONUs. For instance, a FEC code with a reduced code rate may be used as a budget extender without imposing stricter requirements on the optical components at the ONUs, which allows further reduction of the cost of the ONU. For example, it can relax the requirements on the photo diode or may remove the need for an optical pre-amplification at the receiver input stage. A FEC code with an increased code rate may be used to reduce coding overhead, thereby increasing the net information data rate. As a result of adjusting the ONU subsets and the FEC code based on channel properties, the net information rate of each ONU can be brought closer to the theoretical Shannon capacity, thereby increasing the overall throughput of data.

By allocating the ONUs to subsets such that the channel properties of ONUs in the subset are similar, also other aspects in the physical layer processing may be adjusted per subset. For example, applying a higher-level Pulse Amplitude Modulation (PAM) for subsets with better channel properties may increase the data rate for those subsets significantly. In an example comprising two subsets of ONUs, a first subset may contain ONUs whose channel properties support four-level PAM, PAM-4, reception, whereas the second subset contains all other ONUs that may support PAM-2 or Non-Return-to-Zero, NRZ, modulation. The allocation of ONUs to subsets may also be based on the ONU capability. This allows for an upgrade scenario or a cost optimized deployment, where initial deployments or cost sensitive end users employ NRZ-capable ONUs, and ONUs supporting higher order PAM are seamlessly introduced in a later stage or at performance demanding end users. It must be noted that NRZ and higher order PAM may use the same baud rate or symbol rate, allowing NRZ ONUs to maintain their Clock and Data Recovery, CDR, locked during codewords modulated by PAM-4 and vice versa.

The above-mentioned advantages are achievable with a limited number of codeword sets, i.e. with a small number of subsets of ONUs. For example, the above-mentioned advantages are achievable with two subsets of ONUs.

According to example embodiments, the OLT may be further configured to perform providing subset information identifying the subset of ONUs.

In high-speed optical networks, for example optical networks operating at 25 Gbit/s and 50 Gbit/s line rate, all ONUs have to decode the received stream, decapsulate the decoded data frames, select the data frame addressed to them and discard the others at a full line rate of 25 Gbit/s or 50 Gbit/s, respectively. Furthermore, the increase in data rate also requires an increase in decoding strength, which further introduces a considerable amount of additional complexity at the ONUs. By providing subset information, information to the ONUs is provided so that each of them can decode only the codewords in the stream that might comprise data frames addressed to it.

The subset information may include the unique identifiers of the respective ONUs in the subset. Alternatively, the subset information may include information identifying the subset of ONUs rather than each ONU within a subset. The subset information may further include means to uniquely identify the position of the set of codewords intended for the subset of ONUs. In case the interleaving pattern regularly repeats itself with a certain period, the subset information may correspond to the position of the first codeword in the stream of codewords and the distance between codewords of the set after interleaving. The subset information may further identify the FEC code that should be used to decode the respective codewords; or the demodulation format to be used. The subset information may further indicate changes, such as information announcing that one or more ONUs from the subset will be moved to another subset; announcing that the interleaving pattern, code rate, or modulation will change. Such subset information may therefore include time synchronizing information, such as the index of the stream of codewords where the change is applied, or, by counting down the received streams of codewords until the reception of the codeword stream where the change is applied. A newly activated ONU may initially be allocated to a subset that is operated at settings allowing successful communication at relaxed conditions, such as highest period or lowest FEC code rate, and can subsequently be re-allocated to another subset with settings more appropriate for the conditions of the particular channel or capabilities of the ONU. For this purpose, it is beneficial if the first codeword of the frame corresponds to a subset operated at relaxed conditions.

According to example embodiments, the interleaving further comprises displacing two consecutive codewords of a respective set of codewords by at least P codewords in the stream of codewords. Interleaving the codewords in this manner allows maximizing the time between codewords containing data frames designated to the same ONU. In this way, an ONU implementation can be optimized for a specific period P at design time. Different ONUs may support different period values P. For instance, low complexity (i.e. low-end) ONUs may support only higher periods such as P=4, whereas high complexity (i.e. high-end) ONUs may also support lower values down to P=1. The ONU may advertise to the OLT its capability, i.e. the period values P it supports, for example, during start-up or initialization phases. Consequently, the OLT takes the ONU capabilities into account when creating subsets of ONUs and/or assigning the interleaving pattern. The minimal period P that is supported by the least capable ONU in a subset of ONUs determines the minimal distance by which two consecutive codewords of the respective set of codewords should be displaced within the stream of codewords.

According to example embodiments, the interleaving pattern is regularly repeating itself. For instance, within a stream of codewords, the period between consecutive codewords of a subset will always be exactly P. In this way, the ONU processing pipeline can be optimized and simplified for the period P, by reducing the required processing flexibility. In another example, the period may not be P, but the pattern repeats itself in consecutive frames. In this case, the number of codewords for a subset of ONUs can be made proportional to the downstream data rate required by the ONUs of the subset, constrained by the minimum period P supported by all the ONUs in the subset. The required downstream data rate may be statistically configured by the operator based on Service Level Agreements, SLA, or may be updated based on the observed downstream offered load, or a combination of both.

According to example embodiments, the interleaving is performed based on a pre-determined pattern. The interleaving pattern may be communicated to the ONUs by including the interleaving pattern into the subset information. The interleaving pattern may be pre-determined by the OLT and communicated to the ONUs or it may be pre-determined by an external control entity and communicated to the OLT, who further notifies ONUs through the subset information. Yet alternatively, the pre-determined interleaving pattern may be specified by a standardized recommendation, a system vendor or a network operator. Based on the pre-determined pattern, the ONUs can identify the set of codewords of the respective subset of ONUs. The number of codewords based on which the interleaving pattern is composed, may differ for the different sets of codewords. For example, for a repeating pattern of four codewords, the first and third codeword may correspond to a first set of codeword, the second codeword to a second set, and the fourth codeword to a third set. In this way, ONUs with different capabilities can participate in the same optical network without restricting performance to that of the least capable ONU; or subsets of ONUs with different rate demands can participate in the same optical network without imposing the same rate capacity to the other subsets.

According to example embodiments, the allocation of ONUs to subsets may be pre-configured by an operator or a system vendor of the optical network. This way a simpler allocation technique may be realized. According other example embodiments, the allocation of ONUs into subsets may be determined based on different characteristics of the optical network by the OLT. Alternatively, the allocation may be determined by an external control entity which communicates the allocation to the OLT. This allows for a more complex, more intelligent, grouping technique. According to example embodiments, the control entity that determines the allocation of ONUs into subsets may physically reside inside the OLT, but it may also be fully or partly disaggregated from the OLT in an external control entity. Such external control entity is still logically considered part of the OLT and of OLT functionality.

In the above, a distinction is made between the grouping of data units for ONUs, which is a data path function, and the allocation of ONUs into subsets, which is a control function. The grouping of data units for ONUs directly relates to the grouping of ONUs in subsets.

According to further example embodiments, the allocation of ONUs to subsets may be based on the capabilities of a respective ONU. For example, the allocation of ONUs may be performed based on the period P, the decoding rate or the demodulation format supported by the ONUs. Alternatively, the allocation of ONUs may be based on the channel properties (or channel characteristics) between the OLT and the respective ONUs of the subset. Different channel characteristics such as a quality measure, for example the bit error rate, of the communication channel between the OLT and a respective ONU, an optical path loss between the OLT and a respective ONU, or a link utilization between the OLT and a respective ONU may be used as an allocation criterion. The allocation of ONUs may be performed so as to improve the service level agreements, SLAs, that can be offered or guaranteed to the ONUs. The allocation of ONUs to subsets may be changed dynamically when an ONU deactivates or a new ONU activates, or when the SLA or downstream offered load changes. To provide an example of the latter embodiment, when several subsets each have period P and each are assigned 1/P of the full line rate, an ONU may be removed from a subset with a large offered load and moved into a subset with a smaller offered load. In this way the offered load is balanced over the subsets.

According to further example embodiments, an ONU is allocated to a plurality of the subsets of ONUs. For example, an ONU may be allocated to two or more subsets of ONUs.

By allocating an ONU to a plurality of subsets, the ONU is enabled to receive codewords at an increased line rate, while other ONUs in the PON still operate at reduced line rate. For example, ONUs carrying high-end services, such as ONUs used for enterprise or for the back-, front- or mid-haul (collectively called xHaul) of traffic to and from mobile cell sites, may be allocated to plurality of subsets which enables them to operate at up to the full line rate. This allows the co-existence of ONUs with low complexity, such as ONUs for residential use, with full performant ONUs, such as ONUs for enterprise use or for mobile xHaul, on the same optical network. Some data units for a particular ONU may be grouped in a first group, while other data units for that ONU may be grouped in a second group. Consequently, the ONU must decode more than one set of codewords, extract the data units addressed to the ONU from multiple groups and bond the groups of data units together.

Bonding must be performed to ensure that the order of the data units is preserved or can be restored. One way to ensure that the order of data units is preserved, i.e. data units are received by the ONU in the same order as the OLT has received them from the network, is that the OLT may construct the codewords as detailed below. For example, this may be achieved by organizing the data units in (logical or physical) input buffers, one per subset of ONUs. Such input buffers may likely reside inside the OLT but may alternatively reside in a network processor attached to the OLT. The input buffers may be filled up sequentially according to the sequence in which the corresponding codewords will be transmitted. The input buffer takes in data units until it comprises sufficient information bits to complete a codeword. The last data unit is fragmented. The first fragment ends up in the current codeword, and the second fragment ends up in the next codeword of the set, even if the ONU is allocated to more than one subset. With this approach, the data units for an ONU assigned to multiple subsets will be spread out over the different sets of codewords in a chronological fashion, according to when the first bit of the data unit is transmitted. This facilitates the ONU to re-sequence the data units in the right order. Alternatively, means may be provided for the ONU to identify the order of each data units in the sequence of data units, such as a data unit counter encoded in a header appended to the data unit. Based on the data unit counter the ONU may order the data units in the right sequence. For the purpose of such re-sequencing, an ONU may comprise a memory used as resequencing buffer.

According to other example embodiments, the OLT is further configured to perform constructing a subset frame from the respective group of data units. In particular, a subset frame is constructed from the data frames which are formed by encapsulating the data units of a respective group and appending a header thereto. The header may comprise information about the destination of the data frame, that is an ONU of the subset to which the data frame is addressed to. The header may optionally comprise the data unit counter.

According to other example embodiments, the constructing may further comprise appending a messaging channel to the subset frame which comprises the subset information. Therefore, a subset frame per group of data frames is obtained which may comprise subset information. The subset information may be provided in different formats. The subset information may further comprise means for the ONU to identify the right set of codewords, and, may indicate a change in subset or a change in configuration for a subset, as detailed above. The messaging channel may correspond to, or may be part of, a Physical Layer Operations, Administration, and Maintenance (PLOAM) channel.

According to example embodiments, the constructing further comprises providing control information for the subset of ONUs. According to example embodiment, the control information may be provided in the messaging channel.

The control information may include unicast control information for controlling the operation of a respective ONU within a subset of ONUs. Further, the control information may include broadcast control information for controlling the operation of the ONUs within a respective subset of ONUs. This way only relevant control information is included. Further, duplication of the unicast information in every message channels of the subset frames is avoided. This minimizes the additional control messaging overhead, as only broadcast information is repeated in every message channel of each subset frame.

According to other example embodiments, the encoding may be performed on the subset frame. An error correction code may be applied. For example, a linear forward error correcting, FEC, code, such as Reed-Solomon code or a low-density-parity check, LDPC, code may be applied. Other well-known error correcting codes, error detecting codes, coded modulation codes or modulation codes such as cyclic redundancy check, trellis coded modulation, probabilistic constellation shaping, polar codes, turbo codes, hybrid automatic repeat request (HARQ), Bose-Chaudhuri-Hocquenghem (BCH), Duobinary coding, Gray coded PAM-4 modulation, and others may be applied as well.

The encoding of the subset frames may be defined to have codewords with the same size. This will allow to simplify the synchronization at the ONU side.

The encoding may be performed using a different FEC code for a different group of data units. This means that the different groups of data frames corresponding to respective subset frames may be encoded using codes with different error correction capabilities. The FEC codes for the different subset frames may be selected form a pre-defined list. Alternatively, the FEC codes may be determined by the OLT. For example, a subset frame comprising data frames addressed to a subset of ONUs characterized by a worse communication channel may be encoded using a FEC code with a lower code rate. An optical communication channel may be worse than others due to, for instance, comprising a longer fibre with more dispersion or attenuation, or a larger power split factor, or an imperfect fibre connector or splice, or a low performant optical receiver in the ONU. This way stronger error correction protection at the cost of a higher overhead may be provided. The use of different FEC codes for different subset frames does not preclude ability to keep codeword length the same for all sets of codewords.

According to a second example aspect an optical network unit, ONU, configured to communicate in a passive optical network, PON, comprising an optical line terminal, OLT, is disclosed, the ONU comprising at least one processor and at least one memory including computer program code, the at least one memory and computer program code configured to, with the at least one processor, cause the ONU to perform:

receiving a stream of codewords (340) from the OLT;
determining a set of codewords in the stream based on subset information identifying a subset of the ONUs, the set of codewords having data units for the subset of ONUs; and
decoding the set of codewords.

By determining the set of codewords based on subset information, an ONU becomes aware which codewords it has to decode, that is which codewords comprise data frames addressed to it. Depending on the grouping of ONUs into subsets, some ONUs may have to decode for example every second or fourth codeword. This reduces the decoding complexing at the ONU significantly, the ONU's decoder need not operate at a full line rate as the ONU need not to decode all codewords. Moreover, this allows for energy saving. For example, part of the ONU may be put to a sleep mode during the time when the codewords containing data frames containing data units addressed to the other ONUs subsets would be processed. Alternatively, instead of putting the ONU to sleep mode, the ONU may be set to executing a higher number of iterations during the time data frames for the other subsets are being received. This way the ONU achieves better error performance.

As detailed above, the grouping of ONUs into subsets may be based on the capabilities of the respective ONUs. For example, the grouping may be performed based on the period P or rate supported by the ONUs. Alternatively, the grouping may be based on the channel properties (or channel characteristics) between the OLT and the respective ONUs of the subset. Different channel characteristics such as a quality of the communication channel between the OLT and a respective ONU, an optical path loss between the OLT and a respective ONU or a link utilization between the OLT and a respective ONU may be used as a grouping criterion.

According to example embodiments, the ONU is further configured to perform providing its processing capabilities to the OLT for allocating the ONU to a respective subset of ONUs. By providing this information to the OLT, the OLT is able to determine the allocation of the ONUs in subsets and in turn perform the grouping of the data units.

According to example embodiments, the processing capabilities may include the decoding rate of the ONU or a minimally supported displacement in the stream of codewords between two consecutive codewords of the set of codewords.

According to example embodiments, the ONU may be configured to perform decoding sets of codewords; a respective set of codewords having data units for a respective subset of ONUs; and wherein the ONU may be further configured to perform re-sequencing the of data units encoded in the sets of codewords.

Decoding sets of codewords and re-sequencing may be required, when data units for an ONU assigned to multiple subsets and therefore are spread out over the different sets of codewords. In this case, the extracted data units need to be bonded together. Bonding must be performed such that the order of the data units is preserved or can be restored. One way to ensure that the order of data units is preserved, i.e. data units are received by the ONU in the same order as the OLT has received them from the network is by organizing data units in (logical or physical) input buffers, one per subset of ONUs. Such input buffers may likely reside inside the OLT but may alternatively reside in a network processor attached to the OLT. The input buffers are filled up sequentially according to the sequence in which the corresponding codewords will be transmitted. The input buffer takes in data units until it comprises sufficient information bits to complete a codeword. The last data unit is fragmented. The first fragment ends up in the current codeword, and the second fragment ends up in the next codeword of the set, even if the ONU takes part in more than one subset. With this approach, the data units for an ONU assigned to multiple subsets will be spread out over the different sets in a chronological fashion, according to when the first bit of the data unit is transmitted. This facilitates the ONU to re-sequence the data units in the right order. Alternatively, means may be provided for the ONU to identify the order of each data units in the sequence of data units, such as a data unit counter encoded in a header appended to the data unit. Based on the data unit counter the ONU may order the data units in the right sequence. For the purpose of such re-sequencing, an ONU may comprise a memory used as resequencing buffer.

According to a third example aspect a method is disclosed comprising:
grouping, by an optical line terminal, OLT, configured to communicate in a passive optical network, PON, with optical network units, ONUs, data units for the ONUs in groups, wherein a group comprises data units for a subset of the ONUs;
encoding the groups of data units into respective sets of at least one codeword;
interleaving the at least one codeword of the respective sets thereby obtaining a stream of codewords; and
sequentially transmitting the stream of codewords to the ONUs.

According to a fourth example aspect a method is disclosed comprising:
receiving, from an optical line terminal, OLT, configured to communication in a passive optical network, PON, with optical network units, ONUs, a stream of codewords;

determining a set of codewords in the stream based on identification information identifying a subset of the ONUs, the set of codewords having data units for the subset of ONUs; and decoding the set of codewords.

The various example embodiments of the first example aspect may be applied as example embodiments to the other example aspects.

BRIEF DESCRIPTION OF THE DRAWINGS

Some example embodiments will now be described with reference to the accompanying drawings.

FIG. 6-FIG. 10 show various example embodiments of grouping of data units according to the present disclosure.

DETAILED DESCRIPTION OF EMBODIMENT(S)

The techniques described in the below embodiments may be applied to any type of time-division multiplexing, TDM, based PON technologies, such as gigabit PON, G-PON, ethernet PON, E-PON, and even higher speed PONs, such as 10 gigabit symmetrical PON, XGS-PON, 50 Gigabit PON and others.

Figure 1:
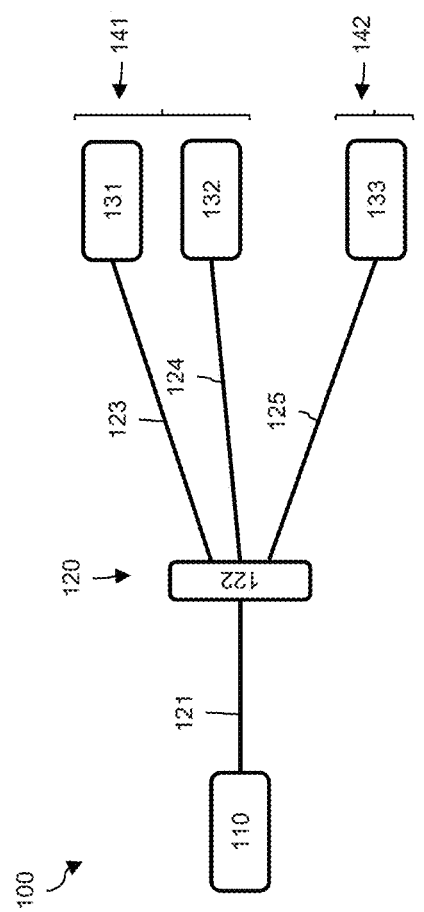
FIG. 1 shows a PON employing an OLT according to example embodiments of the present disclosure.

FIG. 1 shows an example architecture of an optical network 100 which may be operable according to a certain PON standard or technology. The optical network 100 comprises an OLT 110 and a plurality of endpoints or ONUs, 131-133, via an optical distribution network, ODN 120. In this example, the OLT 110 is coupled to three endpoints. The ODN has a tree structure and thereto comprises an optical feeder fibre 121, a passive optical splitter/multiplexor 122, and N optical distribution fibres or drop fibres 123-125 that connect the splitter 122 to the respective ONUs 131-133. In the downstream, a passive splitter splits the optical signal coming from the OLT into N lower power optical signals to N ONUs 131-133. In practice, the ODN may comprise a concatenation of multiple passive splitters or passive optical taps between the OLT and any ONU.

Figure 2:
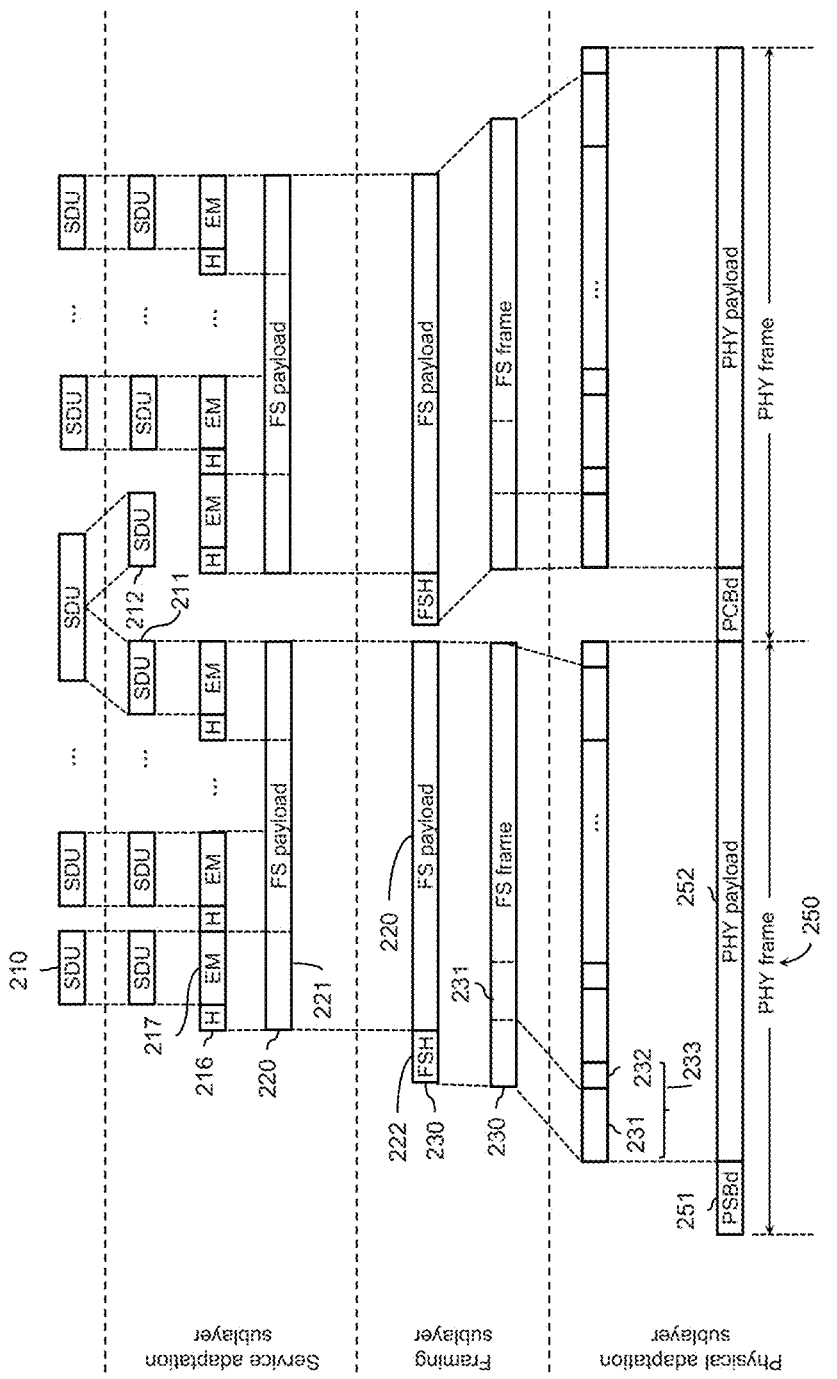
FIG. 2 shows a conventional way of construction of a frame.

FIG. 2 shows an example structure of a PON frame 250, inspired by the frame structure used in XGS-PON, and its construction in an OLT 110. A downstream PON frame 250 has a fixed length of 125 µs and comprises a physical synchronization block downstream, PSBd, 251 and a physical layer (PHY) payload data 252. The PSBd 251 may comprise a synchronization pattern, Psync, a superframe counter and an operation control structure, allowing an ONU amongst others to acquire frame delimitation, time synchronization and operational settings including those used for FEC. The PHY payload 252 may further comprise a Framing Sublayer Header, FSH, 222 and framing sublayer payload 220. The FSH may comprise a bandwidth map, BWmap and a number of multicast or unicast PLOAM messages. The BWmap field notifies the ONUs 131-133 of the upstream bandwidth allocation. It specifies the start and end of the upstream timeslots of each ONU, thereby ensuring that all ONUs send their data to the OLT using the timeslots allocated to them by the OLT 110 to prevent data conflict. The payload data 252 comprises FEC codewords 233 each of which comprise information bits 231 and parity bits 232. The payload bits may be scrambled (or randomized) to avoid undesirable bit sequences, such as bit sequences of all-zeros, all-ones, or to avoid undesirable periodic bit-sequences.

The information bits 231 are constructed from the data units 210. The data units may be of variable size. In an IP network, each data unit may be an Ethernet packet. To ensure a fixed length of the PON frame, some data units may be fragmented into data fragments 211, 222. The data units, SDUs, 210 and data fragment 211, 222 are then encapsulated to form data frames 217. A header 216 comprising identification information identifying the ONU to which the data frame 217 is addressed to is appended (for example prepended) to a respective data unit during the encapsulation. The thus obtained data frames 218 are called EM (Encapsulation Method) frames. In XGS-PON, they are called XGEM (10 Gigabit capable Encapsulation Method) frames.

A framing sublayer (FS) frame 230 is then constructed comprising a set of subsequent data frames 221 referred as FS payload data 220 and a FS header comprising a messaging channel 222. The messaging channel 222 includes control information for the ONUs. The control information may include broadcast control messages addressed to all ONUs, or unicast control messages including control messages addressed to specific ONUs. Further, the messaging channel may include other physical layer operations, administration and maintenance, PLOAM, and bandwidth map, BWmap information for all ONUs. The FS frame may be further provided with a trailer 223 (not shown in the figure). In earlier PON technologies, the FS trailer contained parity information to allow an ONU to identify erroneous frames. For high-speed PONs that employ FEC, the trailer can be however removed. The FS frame 230 is then split into data blocks 231 of equal size. Each data block 231 is encoded by applying a FEC code or an error detection code, which appends parity bits 232 thereto to obtain a codeword 233. The thus formed stream of codewords forms the PHY payload data 252 to which the PSBd 251 is appended (prepended) to form the PON frame.

The OLT 110 broadcasts the PON frame 250 to all ONUs 131-133 in the PON 100. The ONUs 131-133 receive the PSBd 251 and perform operations based on the information contained in the PSBd. Each ONU then has to decode the received data frames and then select only the data frame addressed to it and discard the rest. The selection of the data frame is, however, only possible upon inspection of the header of the decoded data frames. Therefore, each ONU has to decode the GPON frame, decapsulate the EM frames to identify which EM frame contains data addressed to it. In high-speed optical networks, for example, optical networks operating at 25 Gbit/s and 50 Gbit/s line rate, the ONUs have to decode and decapsulate all data frames before being able to identify whether the data frame is addressed to them or not. In addition to that, high-speed optical networks employ FEC codes with increased error correction capabilities. Therefore, apart from being able to perform the above steps at the full line rate, an ONU has to decode the stream of codewords encoded with stronger error correction code. All this introduces a considerable amount of additional complexity at the ONUs, and a waste of energy consumption.

Figure 3:
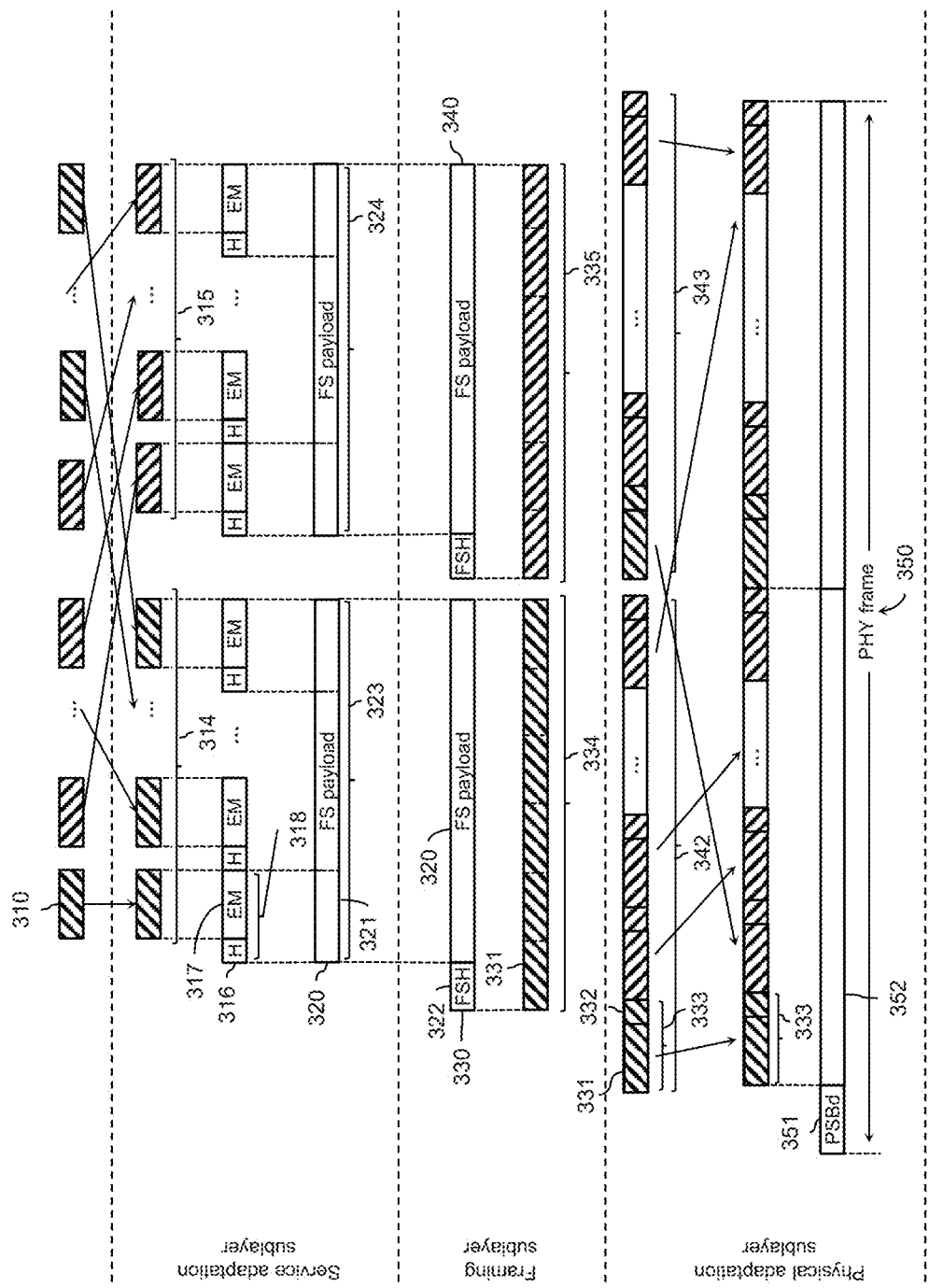
FIG. 3 shows an example embodiment of a construction of a frame and subset frames according to the present disclosure.

FIG. 3 shows the construction of a PON frame according to example embodiments of the present disclosure. Similarly, to the PON fame of FIG. 2, the PON frame according to example embodiments may have a fixed length of 125 μs and comprises physical control block downstream, PSBd, 351 and PHY payload data 352. The PSBd 351 comprises the same data as described above with reference to FIG. 2. Note that FIG. 3 shows one PON frame, whereas FIG. 2 shows two PON frames. Although FIG. 3 shows the PSBd 351 outside of the first codeword, it may alternatively be part of the first codeword. The PHY payload data 352 further comprises a FS header, FSH, 322 and FS payload 320. In contrast to the PON frame of FIG. 2, the FS header 322 further comprises subset information which indicates which codewords comprise data frames addressed to a respective ONU. Further, the FS payload data 320 herein is constructed in a different manner. The FSH 322 content and the construction of the FS payload data 320 will be explained in detail below.

According to example embodiments, the ONUs in the PON are allocated to subsets of ONUs. For example, ONUs 131 and 132 may be allocated to a first subset 141 and the ONU 133 to a second subset 142. Two subsets of ONUs are obtained. According to the subset allocation of the ONUs, the data units 310 are grouped into groups of data units 314, 315 in accordance to the grouping and as shown by the arrows. Although not shown in the figure, the data units 310 may be of various sizes. The last data unit of each group may be fragmented, and the first fragment ends up in the last data frame of the respective group 314, 315 in PHY frame shown in FIG. 3. The second fragment ends up in the first data frame of the respective group in the next PHY frame not shown in FIG. 3. Likewise, typically for each group, the first data frame in the PHY frame 350 comprises only a fragment of a data unit. The data units 310 are therefore grouped into groups 314 and 315. The data units, SDU, 310 are then encapsulated to form data frames 317. During the encapsulation, a header 316 is appended thereto comprising identification information identifying the ONU to which the data frame 317 is addressed to. Two sets 323 and 324 of data frames 318 are thus obtained from which two subset frames 330 are 340 are constructed.

Each subset frame comprises a respective set of data frames 323 and 324, (i.e. FS payload data 320) and a respective FS header 322 comprising a messaging channel 322. The messaging channel 322 includes control information for the respective subset of ONUs. The control information may include broadcast control messages addressed to the subset of ONUs, unicast control messages including control messages addressed to a specific ONU of the subset. As broadcast control messages are addressed to all ONUs in the PON, the broadcast messages are included in the messaging channel 322 of the respective subset frames. Further, the messaging channel 322 may include physical layer operations, administration and maintenance, PLOAM, and bandwidth map, BWmap information for the subset of ONUs. In case the PSBd is outside of the first codeword of the first set, as shown in FIG. 3, the broadcast PLOAM messages may be, wholly or partially, appended to the PSBd instead. This allows avoiding reporting the PLOAM messages in the messaging channels of the subset frames. The subset frames are then split into data blocks 331 of equal size, with a possible exception for the last block of the PHY frame, which may be of different size to match the PHY frame length. The respective data blocks are encoded by applying a FEC or error detection code which appends parity bits 332 thereto to obtain a codeword 333 comprising information bits 331 and parity bits 232. Two sets 342 and 343 of codewords are thus obtained. The codewords 333 of the two sets 342 and 343 are then interleaved as shown by the arrows to form a stream of codewords, i.e. the PHY payload data 352. The bits in the stream may be scrambled (or randomized) to avoid undesirable bit sequences, such as bit sequences of all-zeros, all-ones, or to avoid undesirable periodic bit-sequences. The thus formed stream of codewords forms the payload data 352 to which the PSBd 351 is appended to form the PON frame.

Subset information identifying how the codewords in the stream are distributed may be included in the messaging channel. The subset information may comprise information about the positions of all the codewords of a set of codewords in the stream. For instance, the subset information may comprise the number of codewords, the index of the first codeword, and, the codeword period P of a set of codewords. The index may indicate the first codeword to be decoded by an ONU in a PHY frame, and the codeword period P may indicate the displacement between two codewords of a set of codewords in the stream. For example, an index equal to zero, i.e. idx=0, and a period equal to two, i.e. P=2, indicates that an ONU need to decode every second codeword starting from the first codeword in the stream. In this example, the subset information is comprised in the subset frame. In this way, some changes to subset information, such as index, codeword structure, or moving an ONU to another subset needs to be communicated ahead of time, for example in one or more earlier frames. For robustness, i.e. for ensuring an ONU remains synchronized with the OLT, such change announcement may be repeated over several frames before the change is synchronously implemented at OLT and ONU. Alternatively, the subset information is appended to the PSBd. PSBd may be outside of the first codeword or may be comprised within the first codeword which may be encoded by a default code.

By distributing the codewords as described above, in a PON operating at 50 Gbit/s, lower complexity ONUs may still operate at reduced line rate in the PON. In this example, the ONUs 131-132 are assigned to the first group 141 and thus operate at a combined 25 Gbit/s or each ONU operates on average at one fourth of the line rate, i.e. 12.5 Gbit/s per ONU, while the ONU 133 is assigned to the second group 142 and operates at a half of the line rate, i.e. at 25 Gbit/s.

Figure 4:
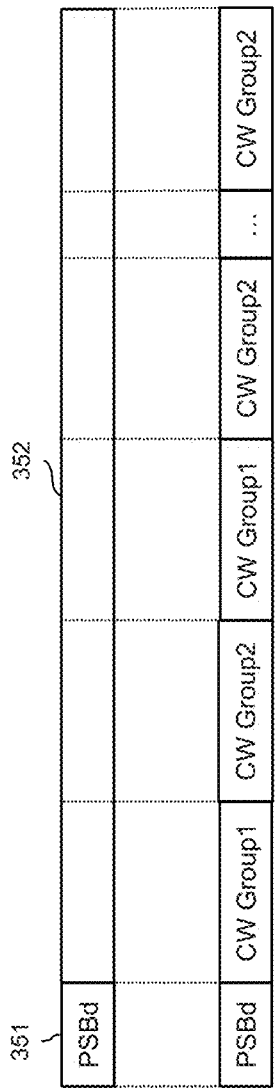
FIG. 4 shows an example embodiment of a frame and subset frames according to the present disclosure.

FIG. 4 shows an example embodiment of the PHY payload data 352 comprising a stream of codewords constructed according to the present disclosure. As shown in the figure, the stream of codewords with codewords comprising data frames addressed to a respective ONU distributed within the stream. For example, the first ONU 131 assigned to the first group 141 needs to decode codewords of the first group, i.e. Group1, the second ONU 132 assigned to the first group 141 has to decode the same codewords and the third ONU 133 assigned to the second group 142 has to decode codewords of the second group, i.e. Group2. By interleaving the codewords of the respective sets in this manner, the time between the codewords containing data frames addressed to a respective ONU is maximized. Note again that the PSBd is drawn outside of the first codeword, but that alternatively, it may be comprised within the first codeword of the first group.

Figure 5:
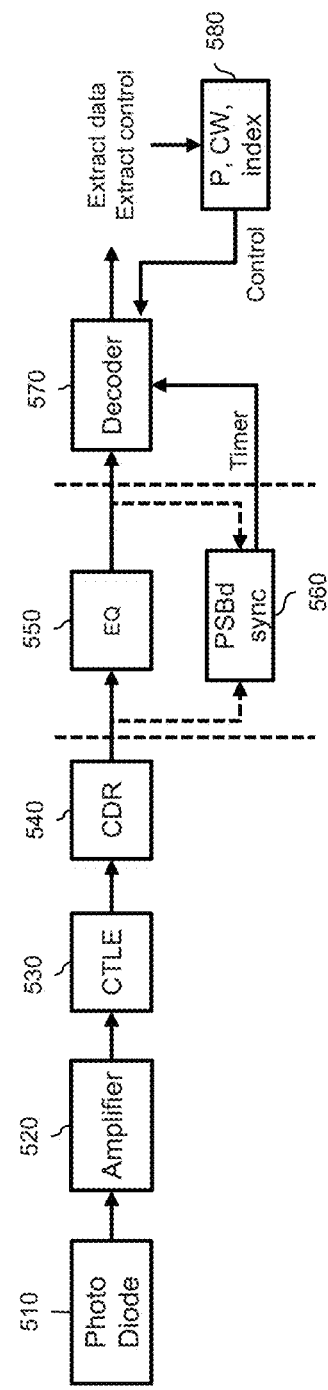
FIG. 5 shows an example embodiment of an ONU according to the present disclosure.

FIG. 5 show an implementation of an ONU according to example embodiments. The ONUs 131-133, each may comprise a photo diode 510, a set of amplifiers 520 including for instance a transimpedance, linear, or limiting amplifier, a continuous time linear equalizer, CTLE, block 530, a clock and data recovery, CDR, block 540, an equalizer, EQ, 550, and a decoder 570 in the data path. The ONU performs the steps performed by the OLT explained with reference to FIG. 3 in reverse order (i.e. from bottom to top). After the decoder, the ONU will decapsulate the frames. The ONU further may comprise a block which parses the physical recovery block downstream, PSBd, sync block 560, and a control block 580. The photo diode 510 which may be an Avalanche Photo Diode or a pin diode converts the received incident light into an analogue current signal. The transimpedance amplifier in 520 then converts the analogue current signal into a voltage signal. The voltage signal is then processed in CTLE block 540 to improve signal quality or to recover for bandwidth limitation. The thus processed analogue voltage signal is then fed to the CDR block 550 which converts the latter into a digital signal and maintains symbol synchronization. The CDR may be built using conventional methods or instead may employ analog to digital convertors, ADCs. The digital signal is then fed to the EQ 550 which further improves the signal quality. The resulting digital signals, be it data bits or log likelihood ratios, form the stream of codewords 352. The stream of codewords is then fed to the decoder 570 which decodes the codewords based on the control information provided by the control block 580. In some embodiments, the PSBd sync block 560 may be included in the EQ 550 or vice versa, some form of equalization may be included in the PSBd sync block 560. The PSBd sync 560 extracts the frame synchronization information as well as information on the start of the frame and the frame boundaries from the PSBd 351. The control block 580 controls the operation of the decoder 570 and subsequently the de-framer which decapsulate the decoded data frames (not shown in the figure). The messaging channel, which may be included in the FS header, comprises the subset information which indicates which codewords comprise data frames addressed to a respective ONU. This information is subsequently used to control the decoding of the codewords 352 in the stream. The control block 580 controls which codewords of the stream are to be decoded by the decoder 570. The control block therefore holds information for example on the period, P, of the codewords in a set, etc. The present disclosure allows the equalization, decoding, decapsulation, and so on, to be performed at lower speed, while the photodiode, amplifier, CTLE, and CDR would typically remain to operate at full speed so as to maintain clock and data recovery locked throughout the downstream PHY frame.

The grouping of data units may change. However, the change has to be at a slow timescale; meaning, the grouping should be known before a frame is constructed and fixed for the duration of the frame. This allows an ONU to determine which codewords to decode once it locks onto the PSBd.

Figure 6:
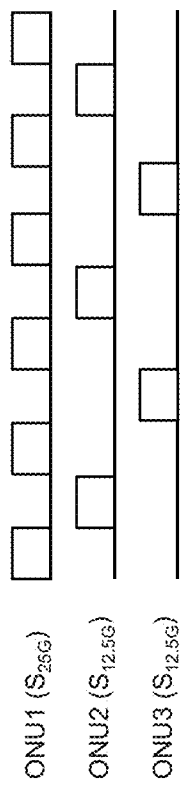

FIG. 6 shows how the codewords of the ONUs may be distributed in the FS frame. In this example, the codewords of each set of codewords are regularly spaced. Every odd-numbered codeword may contain data designated for (or addressed to) ONU 133 (indicated as ONU1 in the figure), every first even-numbered codeword may contain data addressed to ONU 131 (indicated as ONU2) and every second even-numbered codeword may contain data addressed to ONU 132 (indicated as ONU3).

Depending on the number of groups, different ONU implementations may be supported. In other words, an ONU may be supporting a different codeword period, P. A period of P=2 means an ONU is enabled to decode codewords that are one codeword apart, meaning the ONU is able to operate at a half the line rate. An ONU supporting a period of 4, P=4, means the ONU is able to operate at a fourth of the line rate. An ONU may be configured to support different codeword period P.

For example, all the ONUs in the PON may be supporting a period of P=4, while only a few of them may be also supporting a period of P=1 or P=2. For an optical network operating at 50 Gbit/s, P equal to 1, 2, and 4 would correspond to 50 Gbit/s, 25 Gbit/s and 12.5 Gbit/s. P=4 enables an effective peak rate of above 10 Gibt/s per ONU. This allows scaling the PON with limited complexity. Furthermore, it allows having ONUs supporting the full line rate and have minimal latency, i.e. P=1.

ONUs operating at different data rates, such as 50 Gbit/s, 25 Gbit/s, 16.6 Gbit/s or 12.5 Gbit/s, may be supported by the PON. For example, a PON may support the operation of three ONUs; one ONU operating at 25 Gbit/s and the other two ONUs at 12.5 Gbit/s, as in FIG. 6. Generally speaking, each rectangle depicted in FIG. 6 (and figures FIG. 7 to FIG. 10) corresponds to a subset of ONUs each sharing the data rate of the subset. In the example of FIG. 6, the ONUs may be allocated to three subsets, i.e. each ONU in a different subset. Therefore, the first subset of ONUs (i.e. of which ONU1 is member) shares 25 Gb/s, the second subset of ONUs (i.e. of which ONU2 is member) shares 12.5 Gbit/s and the third subset (i.e. of which ONU3 is member) shares the remaining 12.5 Gbit/s. Therefore, the first codeword in stream will be the codeword of the first subset, the second codeword in the stream will be the codeword of the second subset and so on.

Figure 7:
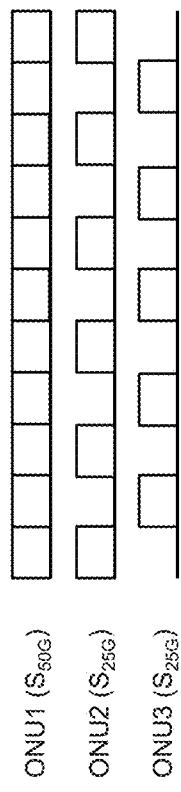

FIG. 7 shows an example where ONU1 must operate at period P=1 (i.e. at up to 50 Gb/s or at low latency), whereas ONU2 and ONU3 can operate at period P=2. In such case, two subsets of ONUs are required. To allow for ONU1 to operate at up to 50 Gbit/s, ONU1 has to be assigned to each of the subsets. To allow ONU2 and ONU3 to operate at 25 Gbit/s, ONU2 and ONU3 have to be assigned to different subsets. For example, ONU1 and ONU2 may be assigned to a first subset and ONU1 and ONU3 assigned to a second subset.

Figure 8:
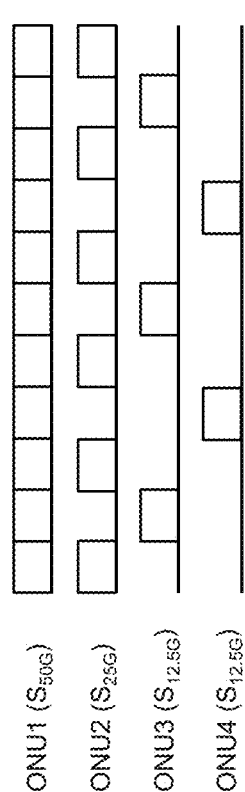

FIG. 8 shows another example of ONU1 operating at up to 50 Gbit/s and ONU2 operating at up to 25 Gbit/s, and, ONU3 and ONU 4 operating at up to 12.5 Gbit/s. In such case, the ONUs may be combined in three subsets, where ONU1 will be assigned to each subset, ONU2 will be assigned to a first subset and ONU3 to a second subset and ONU4 will be assigned to a third subset.

Figure 9:
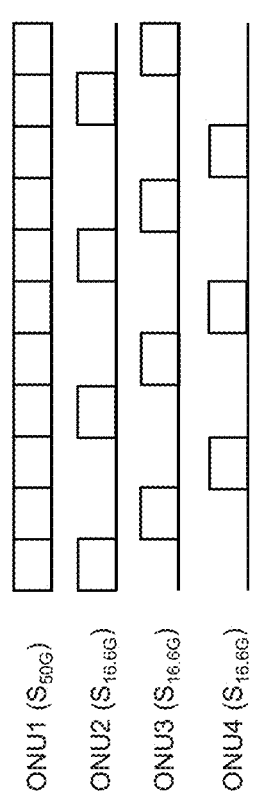

FIG. 9 shows further example of ONU1 operating at up to 50 Gbit/s and ONU2 to ONU4 operating at up to 16.6 Gbit/s. In this figure, the ONUs are allocated into three subsets. For example, ONU1 and ONU2 may be allocated to the first subset, ONU1 and ONU3 to the second subset, and ONU1 and ONU4 to the third subset. This way, ONU1 may operate at up to 50 Gbit/s and the other three ONUs at up to 16.6 Gbit/s.

FIG. 10 shows an example in which ONU1, ONU2, and ONU3 have the capabilities to operate at a period P=2, and in which the interleaving pattern is not periodic, but is adjusted. For instance, the period may be adjusted based on the downstream offered load of the ONUs. At the beginning of the example, the ONUs all operate at a period P=3, and evenly share the channel. Due to an increased load of ONU1 and decreased loads of ONU2 and ONU3, the interleaving pattern then changes so that ONU1 operates at P=2 while ONU2 and ONU3 operate at P=4. The modified interleaving pattern as well as moment in time that the pattern should be updated is determined and communicated in advance by the OLT.

As described above, the proposed technique may be applied to time-division multiplexing, TDM, PON technologies, such as gigabit PON, G-PON, ethernet PON, E-PON, 10 gigabit symmetrical PON, XGS-PON, and higher speed PONs. Furthermore, the proposed technique may be applied as well to time- and wavelength-division multiplexing, TWDM, PON technologies in which TDM systems at different wavelengths are stacked on the same PON system. One or more wavelengths in the TWDM PON system then operate as per the present disclosure.

Figure 11:
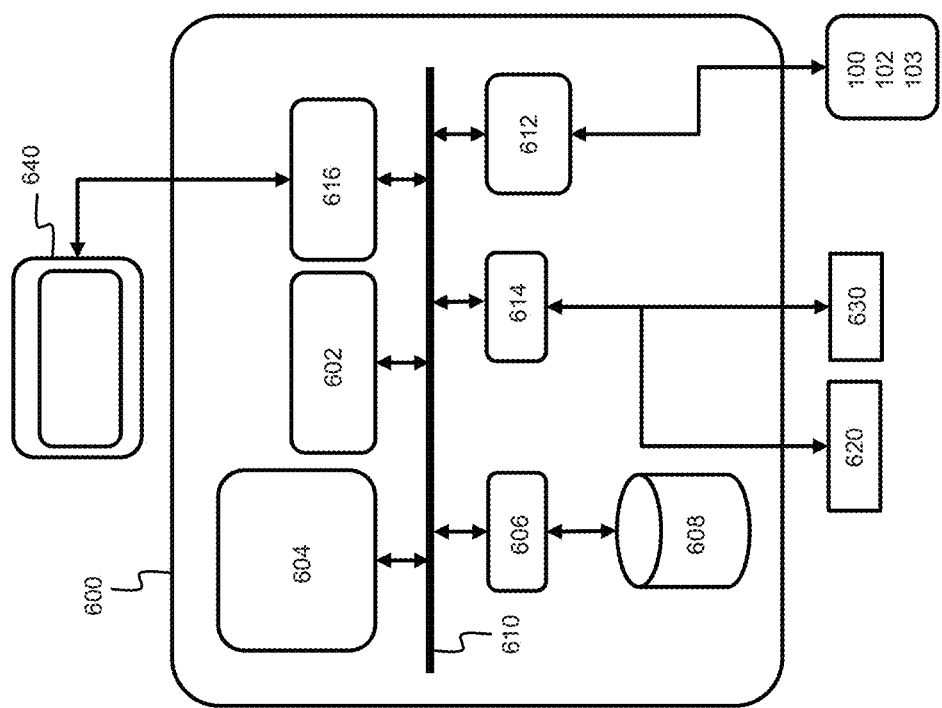
FIG. 11 shows an example embodiment of a suitable computing system for performing one or several steps in embodiments of the invention.

FIG. 11 shows a computing system 600 which may in general be formed as a suitable general-purpose computer and comprise a bus 610, a processor 602, a local memory 604, one or more optional input interfaces 614, one or more optional output interfaces 616, a communication interface 612, a storage element interface 606, and one or more storage elements 608. Bus 610 may comprise one or more conductors that permit communication among the components of the computing system 600. Processor 602 may include any type of conventional processor or microprocessor that interprets and executes programming instructions. Local memory 604 may include a random-access memory, RAM, or another type of dynamic storage device that stores information and instructions for execution by processor 602 and/or a read only memory, ROM, or another type of static storage device that stores static information and instructions for use by processor 602. Input interface 614 may comprise one or more conventional mechanisms that permit an operator or user to input information to the computing device 600, such as a keyboard 620, a mouse 630, a pen, voice recognition and/or biometric mechanisms, a camera, etc. Output interface 616 may comprise one or more conventional mechanisms that output information to the operator or user, such as a display 640, etc. Communication interface 612 may comprise any transceiver-like mechanism such as for example one or more Ethernet interfaces that enables computing system 600 to communicate with other devices and/or systems, for example with other computing devices 650, 660, 670. The communication interface 612 of computing system 600 may be connected to such another computing system by means of a local area network, LAN, or a wide area network, WAN, such as for example the internet. Storage element interface 606 may comprise a storage interface such as for example a Serial Advanced Technology Attachment, SATA, interface or a Small Computer System Interface, SCSI, for connecting bus 610 to one or more storage elements 608, such as one or more local disks, for example SATA disk drives, and control the reading and writing of data to and/or from these storage elements 608. Although the storage element(s) 608 above is/are described as a local disk, in general any other suitable computer-readable media such as a removable magnetic disk, optical storage media such as a CD or DVD, -ROM disk, solid state drives, flash memory cards, . . . could be used. The computing system 600 may be materialized as, or may comprise, an Application Specific Integrated Circuit (ASIC), an Application Specific Instruction set Processor (ASIP), a Field Programmable Gate Array (FPGA), a Digital Signal Processor (DSP) based system or a combination thereof.

Such a computing system 600 is suitable for performing various steps performed by an optical line terminal, OLT, in an optical network according to various embodiments of the present disclosure. According to the present disclosure, the communication interface 612 allows an OLT according various embodiments of the present disclosure to exchange control information and data with the ONUs in the PON. According to the example embodiments, the processor may be running a computer program code which allows the OLT to control the construction of the subset frames 330 and 340. More specifically, the program code performs the steps of: grouping the data units 310 into groups based on a grouping information; forming, from the data units 310, data frames 318 thereby obtaining sets of data frames 323,324; constructing subset frames 334,335 from the sets of data frames 323,324; encoding the data blocks 331 in the subset frames, thereby obtaining sets 342,343 of codewords 333; and, finally interleaving the codewords 333 of the different sets 342,343 thereby obtaining a stream of codewords 350.

Furthermore, the computing system 600 is also suitable for performing various steps performed by an optical network unit, ONU, in an optical network according to various embodiments of the present disclosure. According to the present disclosure, the communication interface 612 allows an ONU according various embodiments of the present disclosure to receive control information and exchange data with an OLT in the PON. According to the example embodiments, the processor may be running a computer program code which allows the ONU to control the decoding of the received frame 340. The processing is therefore configured to control the operation of the clock and data recovery circuitry 540, the EQ circuitry 550, the PSBd sync circuit 560 as well as the decoding circuitry 570. More specifically, the program code performs the steps of: determining the set of codewords 342; 343 in the received frame 350 based on a grouping information identifying a subset of the ONUs to which the ONU is assigned to; and decoding the set of codewords having data units 310 for the subset of ONUs to which the ONU is assigned to.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the scope of the claims are therefore intended to be embraced therein.

It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. An optical line terminal, OLT, configured to communicate in a passive optical network, PON, with optical network units, ONUs, the OLT comprising at least one processor and at least one memory including computer program code, the at least one memory and computer program code configured to, with the at least one processor, cause the OLT to perform:
grouping data units for the ONUs in groups, wherein a group comprises data units for a subset of the ONUs;
encoding the groups of data units into respective sets of codewords;
interleaving the codewords of the respective sets to obtain a stream of codewords; and
sequentially transmitting the stream of codewords to the ONUs,
wherein the OLT is further configured to perform providing, to the ONUs, subset information identifying the subset of ONUs.

2. The optical line terminal, OLT, according to claim 1, wherein the interleaving further comprises displacing two consecutive codewords of a respective set of codewords by at least P codewords in the stream of codewords.

3. The optical line terminal, OLT, according to claim 1, wherein the interleaving is performed based on a predetermined pattern.

4. The optical line terminal, OLT, according to claim 1, wherein an ONU is allocated to a respective subset of ONUs based on channel properties between the OLT and the ONUs.

5. The optical line terminal, OLT, according to claim 1, wherein an ONU is allocated to a plurality of the subsets of ONUs.

6. The optical line terminal, OLT, according to claim 1, wherein the OLT is further configured to perform constructing a subset frame from a respective group of data units; the constructing further comprising appending a messaging channel to the subset frame, wherein the messaging channel comprises the subset information.

7. The optical line terminal, OLT, according to claim 6, wherein the encoding is performed on the subset frame.

8. The optical line terminal, OLT, according to claim 1, wherein the encoding is performed using a different forward error correction, FEC, code for a different group of data units.

9. An optical network unit, ONU, configured to communicate in a passive optical network, PON, comprising an optical line terminal, OLT, the ONU comprising at least one processor and at least one memory including computer program code, the at least one memory and computer program code configured to, with the at least one processor, cause the ONU to perform:
receiving a stream of codewords from the OLT;
determining a set of codewords in the stream based on subset information identifying a subset of the ONUs, the set of codewords having data units for the subset of ONUs; and
decoding the set of codewords.

10. The optical network unit, ONU, according to claim 9, wherein the ONU is further configured to perform providing its processing capabilities to the OLT for allocating the ONU to a respective subset of ONUs.

11. The optical network unit, ONU, according to claim 10, wherein the processing capabilities include a decoding rate or a minimally supported displacement in the stream of codewords between two consecutive codewords of the set of codewords.

12. The optical network unit, ONU, according to claim 9, wherein the ONU is configured to perform decoding sets of codewords; a respective set of codewords having data units for a respective subset of ONUs; and wherein the ONU is further configured to perform re-sequencing of data units encoded in the sets of codewords.

13. A method comprising:
grouping, by an optical line terminal, OLT, configured to communicate in a passive optical network, PON, with optical network units, ONUs, data units for the ONUs in groups, wherein a group comprises data units for a subset of the ONUs;
encoding the groups of data units into respective sets of codewords;
interleaving the codewords of the respective sets thereby obtaining a stream of codewords;
sequentially transmitting the stream of codewords to the ONUs; and
providing to the ONUs subset information identifying the subset of ONUs.

14. A method comprising:
receiving, from an optical line terminal, OLT, configured to communication in a passive optical network, PON, with optical network units, ONUs, a stream of codewords;
determining a set of codewords in the stream based on subset information identifying a subset of the ONUs, the set of codewords having data units for the subset of ONUs; and
decoding the set of codewords.

* * * * *